United States Patent
Brockenbrough et al.

(10) Patent No.: US 9,240,827 B2
(45) Date of Patent: Jan. 19, 2016

(54) METHODS AND APPARATUS FOR IMPROVING REMOTE NFC DEVICE DETECTION USING AN OSCILLATOR CIRCUIT

(71) Applicant: QUALCOMM Incorporated, San Diego, CA (US)

(72) Inventors: Roger Brockenbrough, Los Gatos, CA (US); Sang-Min Lee, Palo Alto, CA (US); Angelica Wong, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 13/956,032

(22) Filed: Jul. 31, 2013

(65) Prior Publication Data

US 2014/0227970 A1 Aug. 14, 2014

Related U.S. Application Data

(60) Provisional application No. 61/763,552, filed on Feb. 12, 2013.

(51) Int. Cl.
*H04B 5/00* (2006.01)
*G06K 7/10* (2006.01)

(52) U.S. Cl.
CPC ............ *H04B 5/0081* (2013.01); *H04B 5/0031* (2013.01); *G06K 7/10128* (2013.01)

(58) Field of Classification Search
CPC .......... G06Q 20/3278; G06K 7/10237; G06K 7/0021; H02J 5/005; H01F 38/14
USPC ....................................................... 455/41.1
See application file for complete search history.

(56) References Cited

U.S. PATENT DOCUMENTS

| | | | |
|---|---|---|---|
| 6,982,645 B2 | 1/2006 | Ricci | |
| 8,140,010 B2 | 3/2012 | Symons et al. | |
| 8,201,745 B2 | 6/2012 | Mair | |
| 2004/0158747 A1* | 8/2004 | Kim | G06F 1/3203 713/300 |
| 2006/0244630 A1* | 11/2006 | Finkenzeller | G06K 7/0008 340/870.07 |
| 2010/0084918 A1* | 4/2010 | Fells | H02J 5/005 307/32 |
| 2010/0144269 A1* | 6/2010 | Do | G06K 7/0008 455/41.1 |
| 2011/0059694 A1* | 3/2011 | Audic | H04B 5/00 455/41.1 |
| 2012/0214411 A1 | 8/2012 | Levy | |
| 2013/0054989 A1* | 2/2013 | Judd | G06F 1/324 713/320 |

OTHER PUBLICATIONS

International Search Report and Written Opinion—PCT/US2014/015783—Apr. 24, 2014, 14 Pages.

* cited by examiner

*Primary Examiner* — Edward Urban
*Assistant Examiner* — Max Mathew
(74) *Attorney, Agent, or Firm* — Arent Fox LLP

(57) ABSTRACT

A method, an apparatus, and a computer program product for wireless and/or inductive communications are provided in connection with improving remote NFC device detection through use of an oscillator circuit connected to an NFC antenna and matching network. In one example, a communications device is equipped to monitor frequency oscillations generated by an oscillator circuit associated with a transmitter path of a NFC antenna and matching network, determine that a number of occurrences of the frequency oscillations from a reference frequency is greater than a frequency deviation threshold, and perform a NFC polling procedure in response to the determination.

36 Claims, 11 Drawing Sheets

METHODS AND APPARATUS FOR IMPROVING REMOTE NFC DEVICE DETECTION USING AN OSCILLATOR CIRCUIT

CLAIM OF PRIORITY UNDER 35 U.S.C. §119

The present application for patent claims priority to Provisional Application No. 61/763,552 entitled "METHODS AND APPARATUS FOR IMPROVING REMOTE NFC DEVICE DETECTION USING AN OSCILLATOR CIRCUIT" filed Feb. 12, 2013, and assigned to the assignee hereof and hereby expressly incorporated by reference herein.

BACKGROUND

1. Field

The disclosed aspects relate generally to communications between devices and specifically to methods and systems for improving remote near field communication (NFC) device detection through use of an oscillator circuit connected to an NFC antenna and matching network.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When using NFC, it is desirable for a poller device to be able to detect the proximity of a listener device (e.g., a passive tag, an active device functioning as a passive tag, etc.) using as little power as possible. Power is a particular concern since, in typical applications, the poller device spends most of its time in the listening mode (cycling between listen and sleep with some duty cycle). Another concern is sensitivity of detection, as it is desirable to detect a coupled device at the edge of the operating volume where coupling is weak.

Currently, the poller device may fully activated (TX+RX antennas) for transmission of a carrier signal and listening for a load modulation response. Alternatively, the poller device may activate the TX antenna and monitor the power consumption, and/or the poller device may activate the TX antenna and monitor power consumption over a frequency sweep. In this case, the frequency corresponding to peak power consumption may be used to discriminate proximity of a coupled device. Each of these schemes requires significant power consumption since the full TX antenna and/or both the TX&RX antennas are enabled. Further, even when just the TX antenna is active, the schemes have limited sensitivity as the variation in TX power consumption only provides a weak function of proximity to a coupled device, particularly at the edge of the operating volume.

Thus, improved apparatuses and methods providing mechanisms for detecting a remote NFC device without excessive power consumption may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving remote NFC device detection through use of an oscillator circuit connected to an NFC antenna and matching network. In one example, a communications device is equipped to monitor frequency oscillations generated by an oscillator circuit associated with a transmitter path of a NFC antenna and matching network, determine that a number of occurrences of the frequency oscillations from a reference frequency is greater than a frequency deviation threshold, and perform a NFC polling procedure in response to the determination.

According to related aspects, a method for improving remote NFC device detection through use of an oscillator circuit connected to an NFC antenna and matching network is provided. The method can include monitoring frequency oscillations generated by an oscillator circuit associated with a transmitter path of a NFC antenna and matching network. Further, the method can include determining that a number of occurrences of the frequency oscillations from a reference frequency is greater than a frequency deviation threshold. Moreover, the method may include performing a NFC polling procedure in response to the determination.

Another aspect relates to a communications apparatus enabled to improve remote NFC device detection through use of an oscillator circuit connected to an NFC antenna and matching network. The communications apparatus can include means for monitoring frequency oscillations generated by an oscillator circuit associated with a transmitter path of a NFC antenna and matching network. Further, the communications apparatus can include means for determining that a number of occurrences of the frequency oscillations from a reference frequency is greater than a frequency deviation threshold. Moreover, the communications apparatus can include means for performing a NFC polling procedure in response to the determination.

Another aspect relates to a communications apparatus. The apparatus can include a processing system, an oscillator circuit, a NFC antenna, and a matching network. In an aspect, the oscillator circuit may be connected to a transmitter path of the NFC antenna and matching network, and be configured to monitor frequency oscillations. Further, the processing system may be configured to determine that a number of occurrences of the frequency oscillations from a reference frequency is greater than a frequency deviation threshold. Moreover, the processing system may further be configured to perform a NFC polling procedure in response to the determination.

Still another aspect relates to a computer program product, which can have a computer-readable medium including code for monitoring frequency oscillations generated by an oscillator circuit associated with a transmitter path of a NFC antenna and matching network. Further, the computer-readable medium may include code for determining that a number of occurrences of the frequency oscillations from a reference frequency is greater than a frequency deviation threshold. Moreover, the computer-readable medium can include code for performing a NFC polling procedure in response to the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Figure 1:
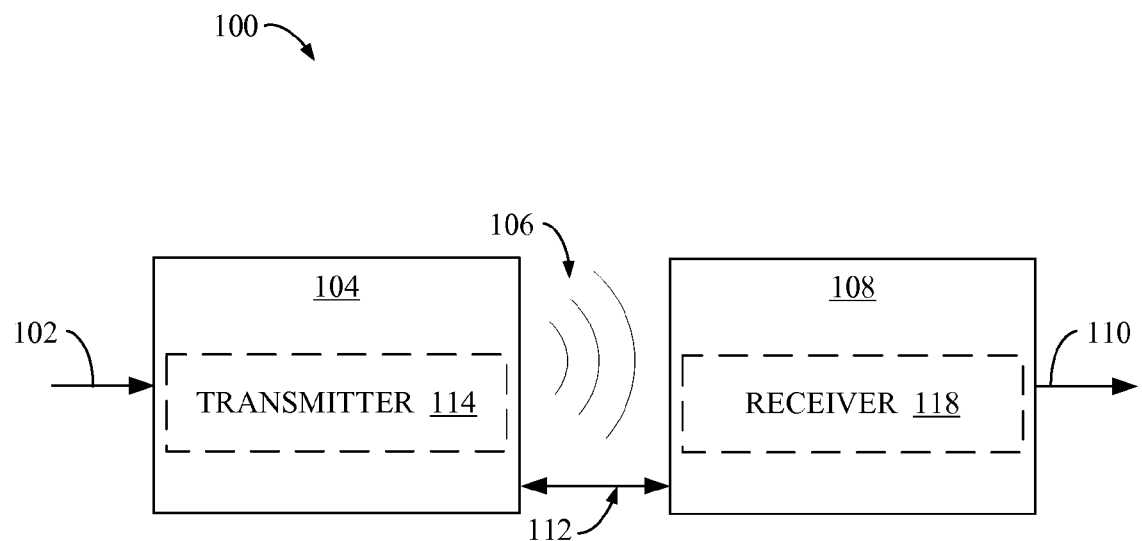
FIG. 1 is a block diagram of a wireless communication system according to an aspect.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field, a coupling mode may be developed between the transmit antenna 114 and the receive antenna 118. The area around the antennas 114 and 118 where this near-field coupling may occur is referred to herein as a coupling-mode region.

Figure 2:
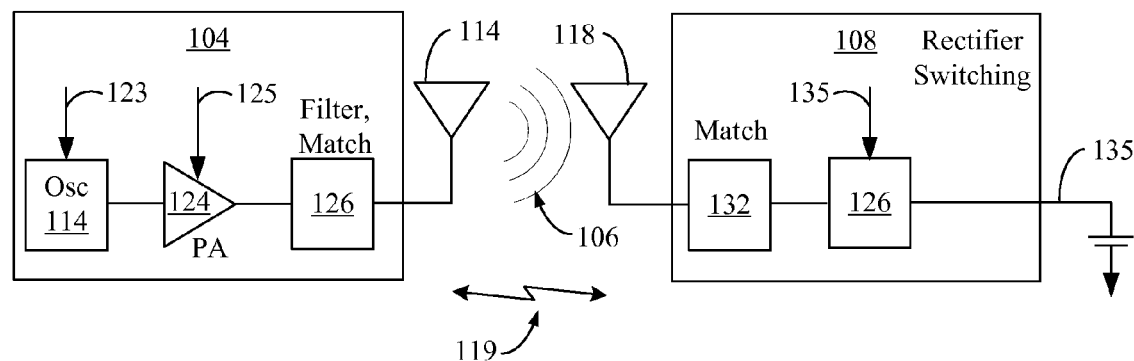
FIG. 2 is a schematic diagram of a wireless communication system, according to an aspect.

FIG. 2 is a schematic diagram of an example near field inductive communications system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, Zigbee, cellular, etc).

Figure 3:
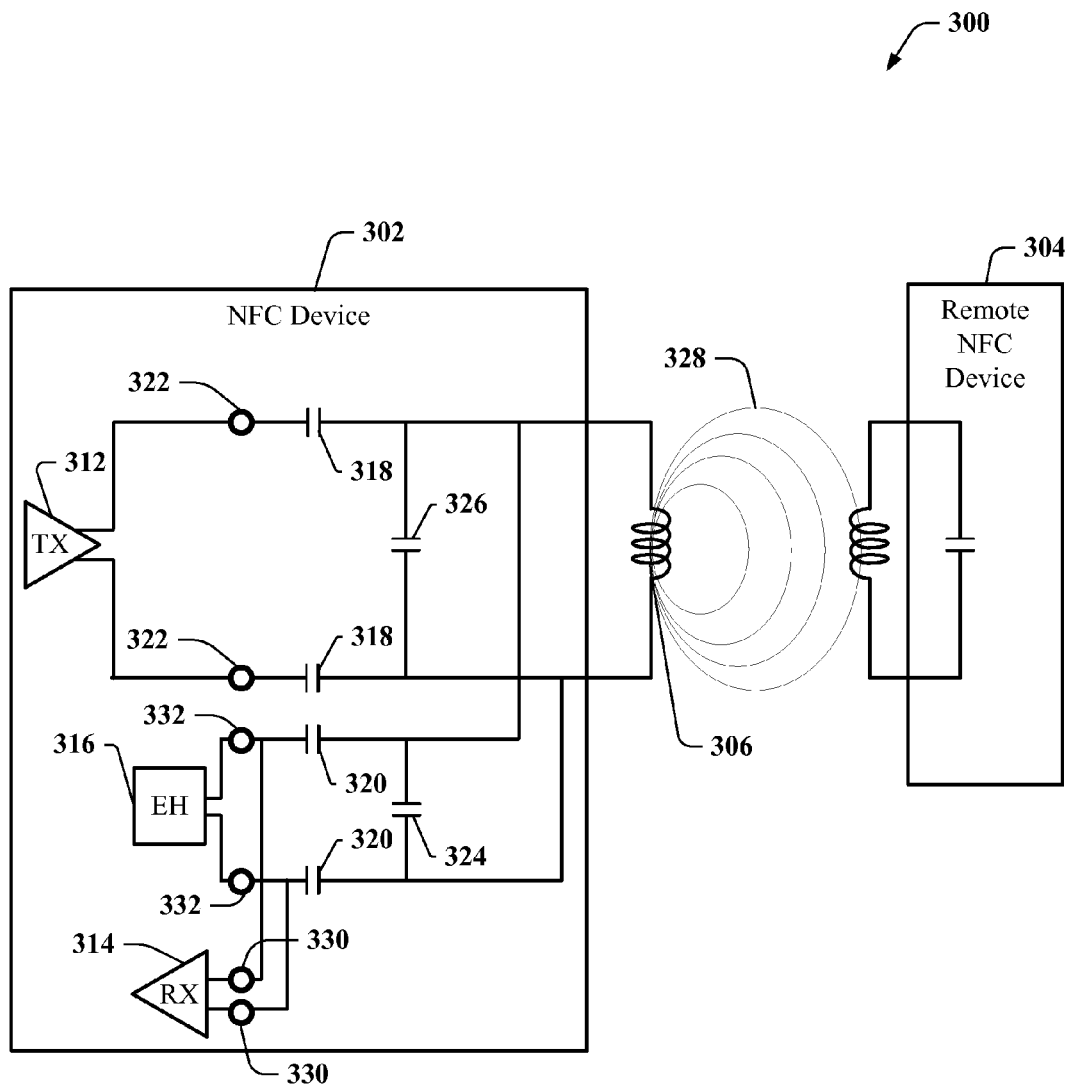
FIG. 3 is a block diagram of a NFC device configuration in an NFC environment, according to an aspect.

With reference to FIG. 3, a block diagram of a communication network 300 according to an aspect is illustrated. Communication network 300 may include a NFC device 302 and a remote NFC device 304 that may be configured to communication using NFC. NFC device 302 may include a NFC antenna coil 306 configured to facilitate NFC communications with remote NFC device 304.

As part of NFC communications, NFC antenna coil 306 may generate an electromagnetic field 328 in the area around the NFC antenna coil 306. The strength of the field may depend on the power source and the size and number of turns in NFC antenna coil 306. Further, impedance mismatches may cause a range of amplitude/phase changes dependant on size and inductance of NFC antenna coil 306 in the magnetic field 328. Capacitor 326 may be connected in parallel with the NFC antenna coil 306, where a transmitter component 312 and capacitors 318 may form an RLC oscillator establishing a resonant circuit with a frequency that corresponds to a transmission frequency (e.g., 13.56 MHz) used by the NFC device 302. Because the wavelength of the frequency used is several times greater than the close proximity distance between the NFC antenna coil 306 and the remote NFC device's 304 antenna coil, the electromagnetic field can be treated as an alternating magnetic field 328. This region of close proximity is referred to as the near field region. The NFC device 302 and remote NFC device 304 may be linked by their mutual inductance, as in a transformer, with the primary coil being the NFC antenna coil 306 and the secondary coil being the remote NFC device's 304 coil. The alternating magnetic field 328 penetrates the remote NFC device's 304 coil when it is in the near field region, inducing an alternating current in the remote NFC device's 304 coil.

When operating in a listening mode, the NFC antenna coil 306, capacitors 320, energy harvester (EH) 316 and a receiver component 314 may form an RLC oscillator establishing a resonant circuit tuned to the transmission frequency of the remote NFC device 304. When the resonant frequency of the remote NFC device 304 corresponds to the transmission frequency of the NFC device 302, this draws energy from the magnetic field 328. This additional power consumption manifests itself in the NFC device 302 as a voltage drop through the supply current to the NFC antenna coil 306. Receiver component 314 may represent a variable load resistance to the NFC antenna coil 306. If the receiver component 314 switches its variable load resistance on and off, this changes the resonant frequency so that it does not correspond to the transmission frequency of the remote NFC device 304, which then may detected as a voltage change by the remote NFC device 304. In this manner, the receiver component 314 can use its stored data to modulate the load resistance on the NFC antenna coil 306 and transfer its stored data from the remote NFC device 304. This describes the basic, one-way "listening", such as would be used in an identity card, tag, etc. transmitter component 312 may be used with receiver component 314 for two-way "read-write" communications.

Further, the various components (e.g., transmitter component 312, receiver component 314, EH 316) may be connected to the NFC antenna (e.g., NFC antenna coil 306) through various pins. In such an aspect, the pins may be associated with the various component paths (e.g., transmitter path 322, receiver path 330, EH path 332, etc.).

Figure 4:
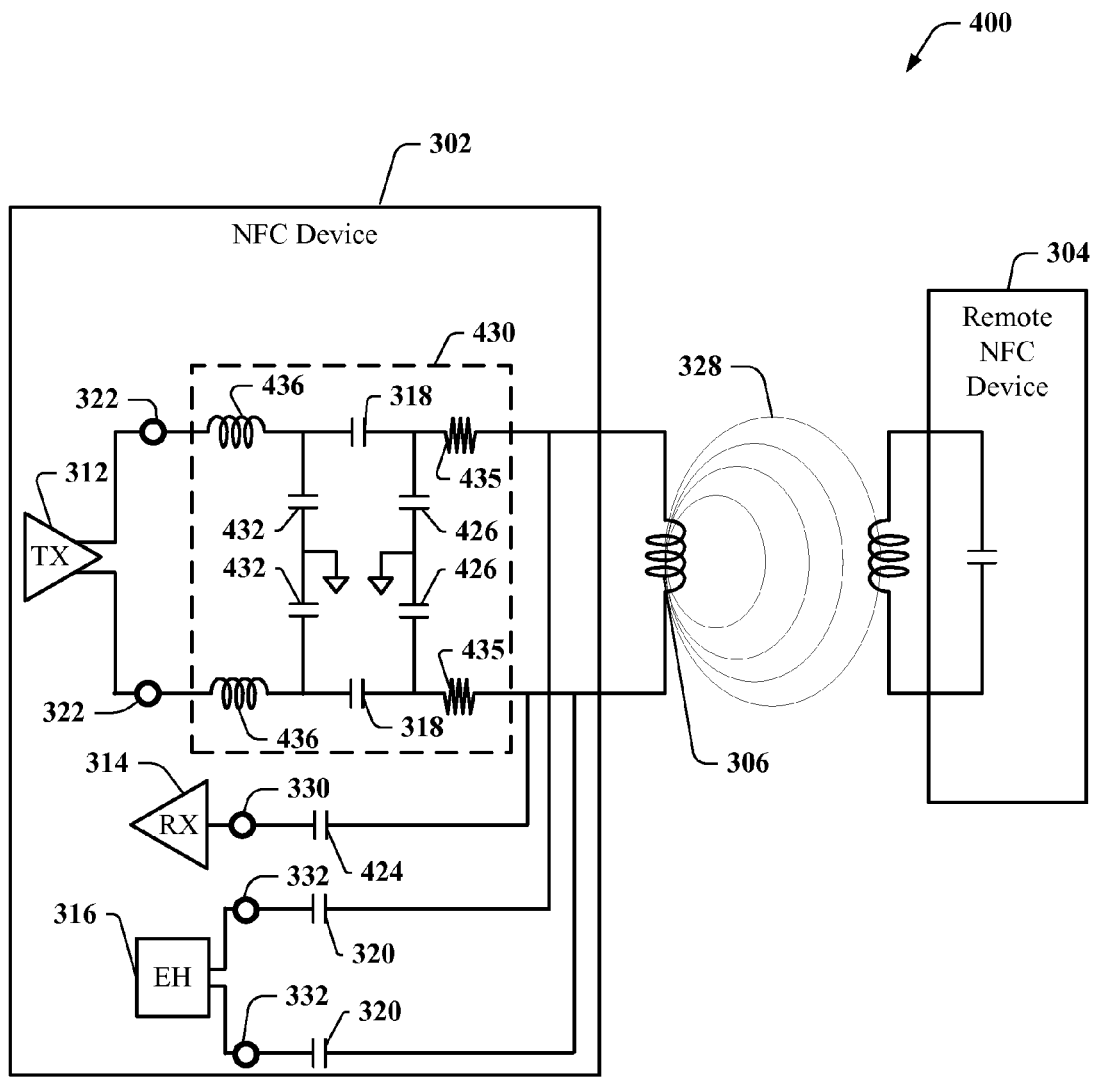
FIG. 4 is a block diagram of another NFC device configuration in an NFC environment, according to an aspect.

With reference to FIG. 4, a block diagram of a communication network 400 according to an aspect is illustrated. Communication network 400 may include a NFC device 302 and a remote NFC device 304 that may be configured to communication using NFC. In the interests of consistency and brevity, component elements are labeled with reference to FIG. 3, and as such, their description is not repeated with respect to FIG. 4.

Further, NFC device 302 may include an electromagnetic interference (EMI) filter 430 between transmitter path pins 322 and the NFC antenna coil 306. In such an aspect, the EMI filter 430 may include various resistors 435, capacitors 426, 432 and inductors 436 configured in such a manner as to filter EMI. Further, in such a configuration, NFC device 302 may include additional capacitors 424 associated with other components (e.g., receiver component 314).

Figure 5:
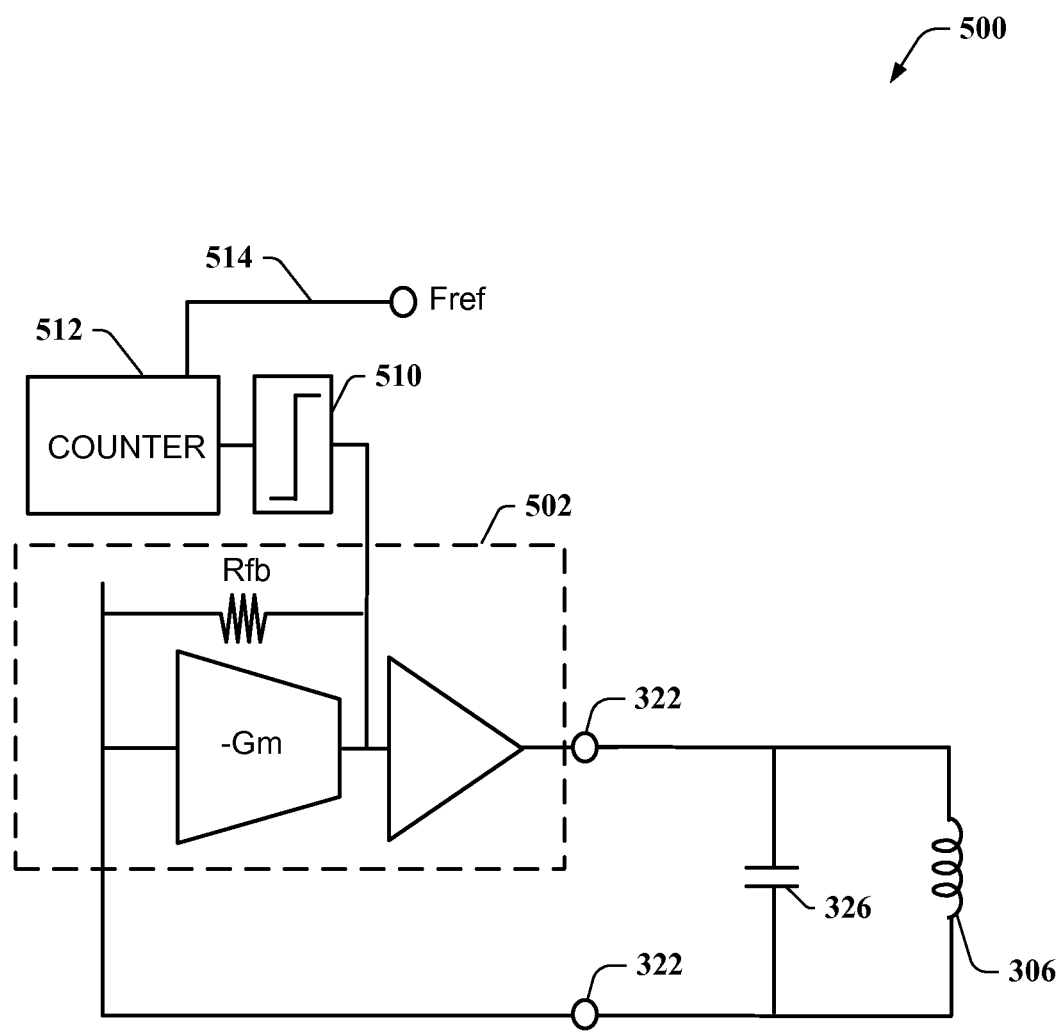
FIG. 5 is a block diagram of an oscillator circuit in an NFC device configuration, according to an aspect.

With reference to FIG. 5, a block diagram of a portion of an NFC device 500 configuration including an oscillator circuitry 502, a squaring buffer 510, and a frequency counter 512, according to an aspect, is illustrated. In the depicted NFC device 500 configuration, the oscillator circuitry 502 may be connected through transmitter path pins 322. Squaring buffer 510 may be connected to oscillator 502 and a frequency counter 512 that is configured to measure the frequency of the oscillator relative to some fixed reference frequency 514. In such an aspect, the oscillator circuitry 502 design may provide positive feedback at some resonance in the matching network and antenna 306 to produce oscillation at a frequency which is a function of the antenna 306 impedance.

Figure 6:
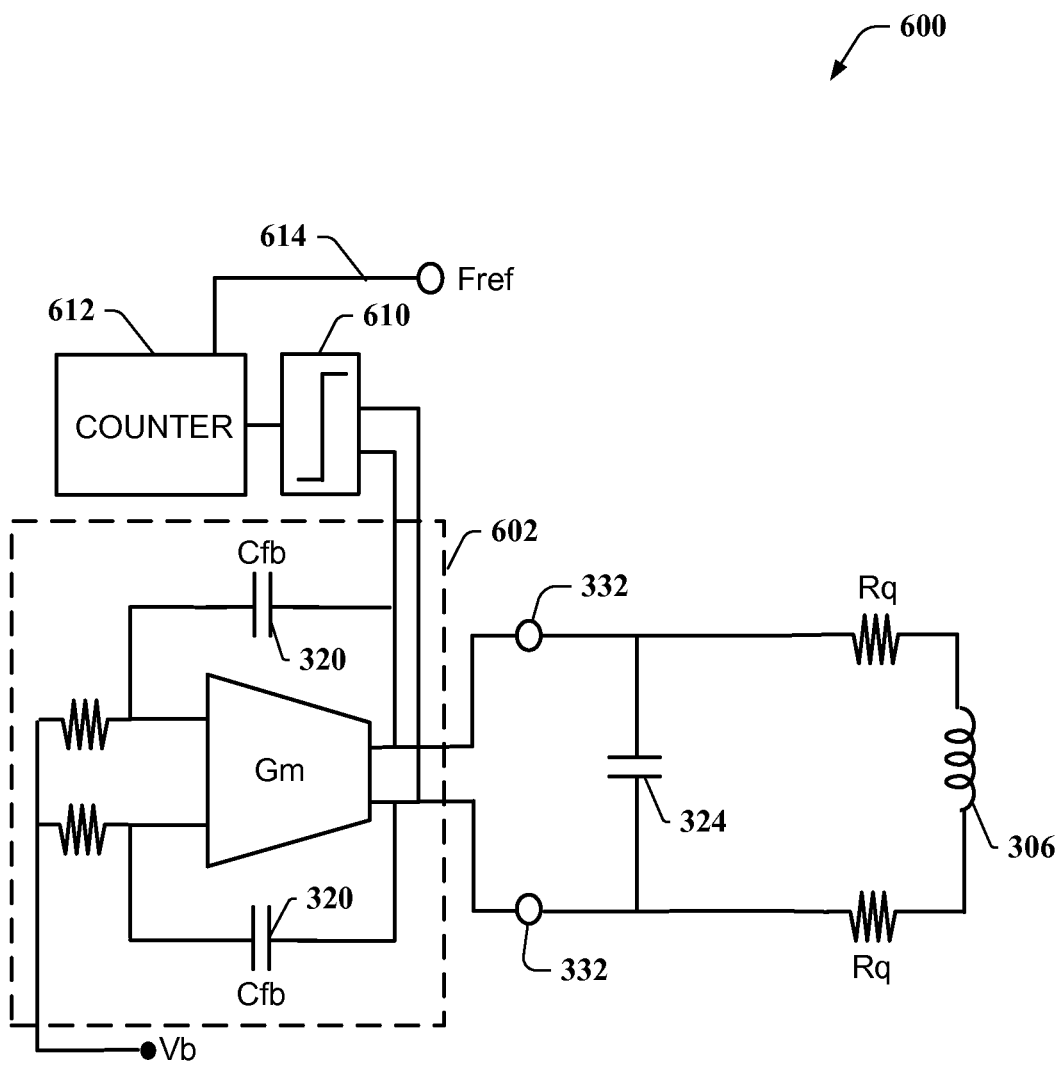
FIG. 6 is a block diagram of another oscillator circuit in an NFC device configuration, according to an aspect.

With reference to FIG. 6, a block diagram of a portion of an NFC device 600 configuration including an oscillator circuitry 602, a squaring buffer 610, and a frequency counter 612, according to an aspect, is illustrated. In the depicted NFC device 600 configuration, the oscillator circuitry 602 may be connected through pins 622 associated with the EH component 316. Squaring buffer 610 may be connected to oscillator 602 and a frequency counter 612 that is configured to measure the frequency of the oscillator relative to some fixed reference frequency 614. In such an aspect, the oscillator circuitry 602 design may provide positive feedback at some resonance in the matching network and antenna 306 to produce oscillation at a frequency which is a function of the antenna 306 impedance.

Figure 7:
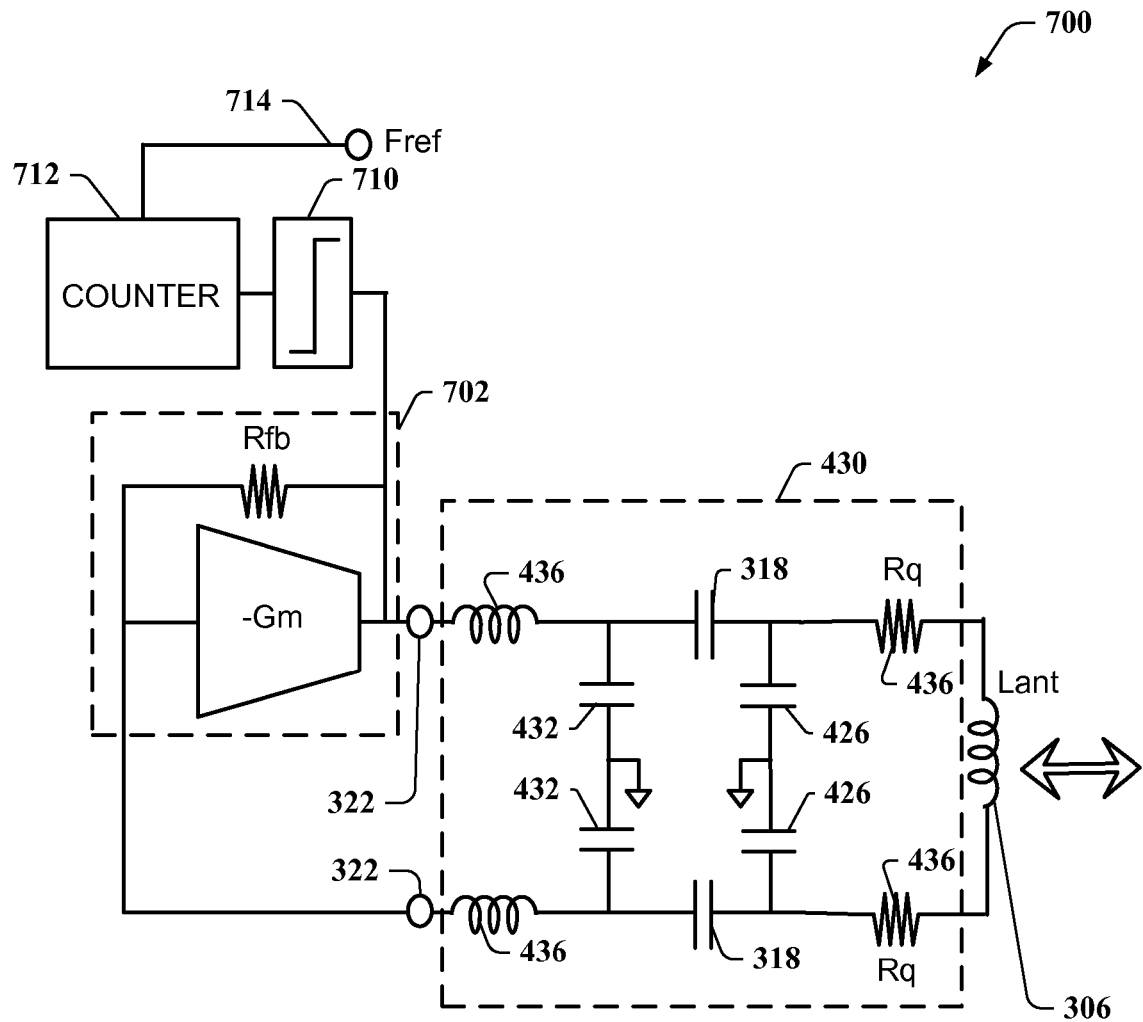
FIG. 7 is a block diagram of still another oscillator circuit in an NFC device configuration, according to an aspect.

With reference to FIG. 7, a block diagram of a portion of an NFC device 700 configuration including an oscillator circuitry 702, a squaring buffer 710, and a frequency counter 712, according to an aspect, is illustrated. In the depicted NFC device 700 configuration, the oscillator circuitry 702 may be connected through transmitter path pins 322. Squaring buffer 710 may be connected to oscillator 702 and a frequency counter 712 that is configured to measure the frequency of the oscillator relative to some fixed reference frequency 714. In such an aspect, the oscillator circuitry 702 design may provide positive feedback at some resonance in the matching network and antenna 306 to produce oscillation at a frequency which is a function of the antenna 306 impedance.

With respect to FIGS. 5, 6, and 7, the oscillator circuitry (502, 602, 702) can be connected to any port 322, 330, 332 of the matching network already in use for normal NFC operation (TX 322, RX 330, EH 332) and/or a custom port (not shown) may be used for the oscillator circuitry (502, 602, 702). FIGS. 5 and 7 illustrate the oscillator circuitry 502, 702 connected to transmitter path pins 322. FIG. 6 illustrates the oscillator circuitry 602 connected to pins 332 associated with EH 316. In operation, the receiver path pins 330 may not be used for connection of the oscillator circuitry (502, 602, 702) because the receiver path 330 may be exposed to high voltage at the antenna 306 due either to the incoming field 328 or due to the outgoing signal comminuted through the transmitter path 322 which experiences a voltage gain across the matching network from the transmitter path pins 322 to the receiver path pins 330. Depending on the impedance at path pins (322, 332), an appropriate oscillator topology can be selected to satisfy loop conditions for oscillation. As depicted in FIGS. 5, 6, and 7, the squaring buffer (510, 610, 710) may be attached to any convenient node in the oscillator circuitry (502, 602, 702).

The antenna 306 impedance is a function of proximity to a coupled device 304. In other words, antenna 306 inductance may change as coupling to the antenna 306 inductance on another device 304 increases. Further, such a change in inductance may cause a shift to a different oscillation frequency (measured by oscillator circuitry (502, 602, 702)). Detection sensitivity in the oscillator circuitry (502, 602, 702) may be based on the accuracy of the frequency measurement (e.g., counter (512, 612, 712)). Such accuracy may be increased through use of an averaging period. In another aspect, the oscillator circuitry (502, 602, 702) may be calibrated (one point or multi-point) using an adaptive algorithm to determine a frequency deviation count threshold.

In an operational aspect, use of oscillator circuitry (502, 602, 702) can assist in determining when there is a change in the environment of the antenna 306 which causes a shift in impedance. In an aspect, the oscillator circuitry (502, 602, 702) may operate with a repetition rate and a resulting count value detected by counter (512, 612, 712) may be compared across cycles (e.g., from one operating cycle to the next). Further, in the operational aspect, when a change in the count value is greater than a frequency deviation threshold, the NFC device may be prompted to perform a full NFC polling procedure to determine whether the frequency deviation is based on the presence of a listener device 304. As such, a NFC device may reduce power consumption because the full NFC polling procedure may only enabled when a shift in impedance is detected using the oscillator circuitry (502, 602, 702).

Figure 8:
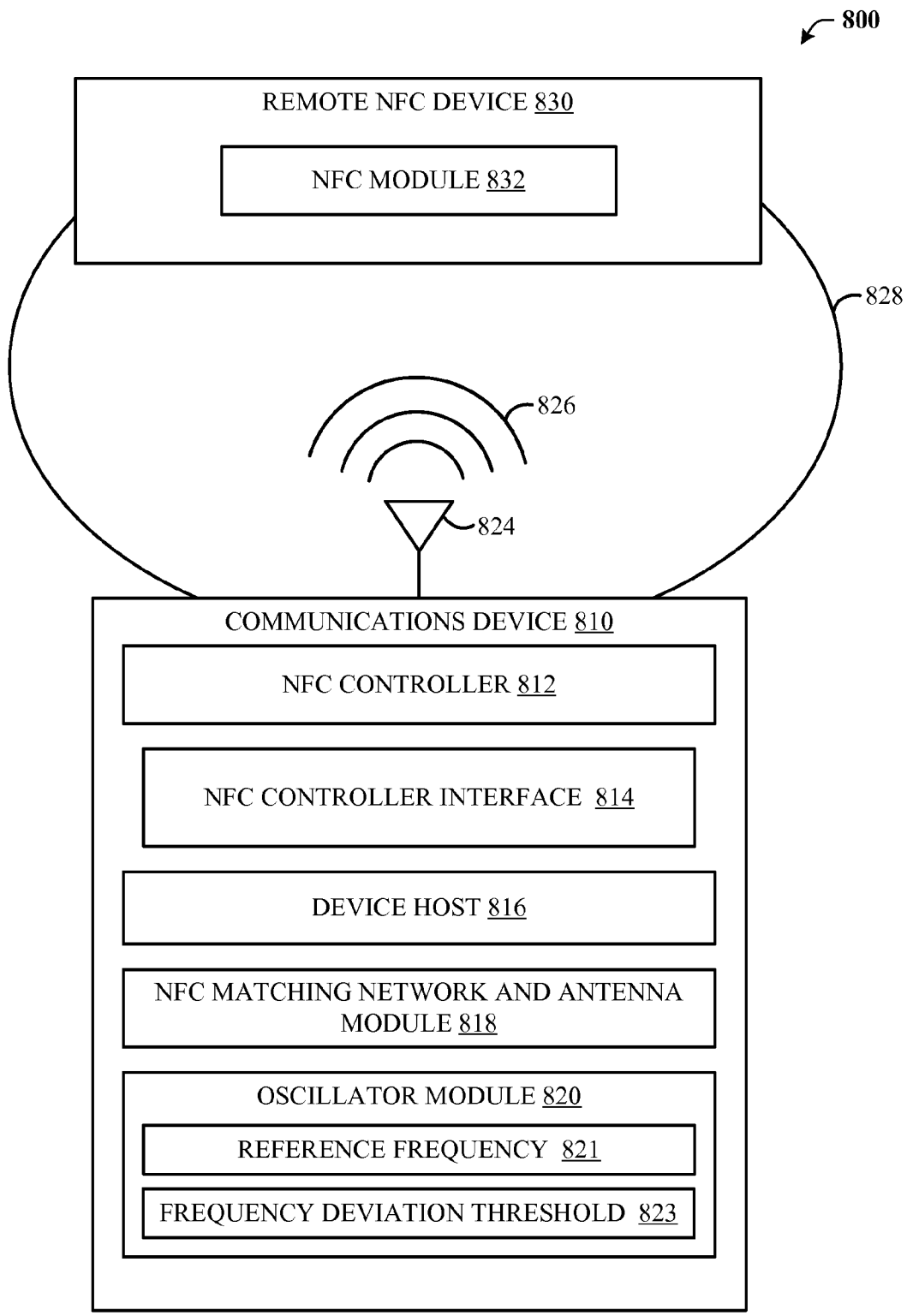
FIG. 8 is a block diagram of a NFC environment.

With reference to FIG. 8, a block diagram of a communication network 800 according to an aspect is illustrated. Communication network 800 may include communications device 810 which, through antenna 824, may be in inductive communication with a remote NFC device 830 using one or more NFC technologies 826 (e.g., NFC-A, NFC-B, NFC-F, etc.). In another aspect, communications device 810 may be configured to be connected to an access network and/or core network (e.g., a CDMA network, a GPRS network, a UMTS network, and other types of wireline, wireless, and inductive communications networks).

In an aspect, communications device 810 may include a NFC controller 812, a NFC controller interface (NCI) 814, and a device host 816. In an aspect, communications device 810 may further include a NFC matching network and antenna module 818 and an oscillator module 820. In operation, device host 816 may be configured to obtain, through NCI 814, and NFC Controller 812 information from remote NFC device 830 through NFC module 832 associated with remote NFC device 830.

As part of determining whether a remote NFC device 830 is within the operating volume 828 of communications device 810, oscillator module 820 may be configured to detect frequency deviations, associated with NFC matching network and antenna module 818, that differ from a reference frequency 821 by more than a frequency deviation threshold 823.

In operation, oscillator module 820 can assist in determining when there is a change in the environment of the antenna 306 which causes a shift in impedance. Further, in the operational aspect, when oscillator module 820 detect a change from reference frequency 821 in the count value is greater than a frequency deviation threshold 823, the communications device 810 may be prompted to perform a full NFC polling procedure to determine whether the frequency deviation is based on the presence of a remote NFC device 830.

Accordingly, communications network 800 provides an environment in which a communications device 810 may be configured to improve power consumption while attempting to detect a remote NFC device 830 in an operating volume 828.

Figure 9:
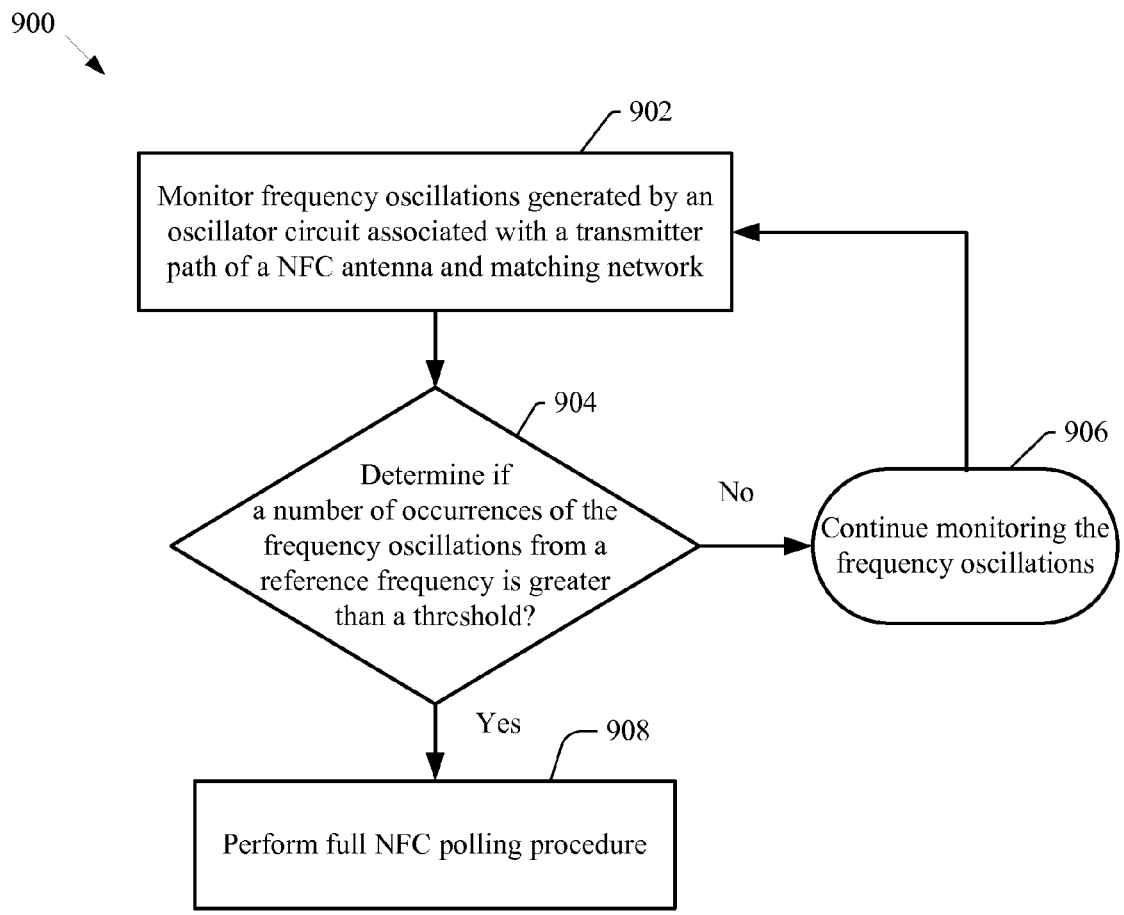
FIG. 9 is a flowchart diagram describing an example for improving remote NFC device detection through frequency oscillation monitoring, according to an aspect.

FIG. 9 illustrates methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 9, a flowchart describing an example process 500 for improving NFC coil tuning in a NFC device is illustrated.

At block 902, a NFC device may monitor frequency oscillations generated by an oscillator circuit associated with a transmitter path of a NFC antenna and matching network. In an aspect, the frequency oscillations may be monitored through use of a frequency deviation counter connected to the oscillator circuit. In such an aspect, the frequency deviation counter may be connected to the oscillator through a squaring buffer. Further, the frequency deviation counter may count deviations from a reference frequency (e.g., the operational frequency of the NFC antenna).

At block 904, the NFC device may determine whether a remote NFC device is potentially within the operating volume of the NFC device based on the frequency deviations from the reference frequency. In an aspect, the frequency deviations may be averaged over time to improve potential accuracy of the frequency deviation counter. In another aspect, frequency deviation may be associated with a change in inductance associated with the NFC device antenna which in turn may be associated with a change in the operating volume (e.g., the presence of a remote NFC device, a piece of metal, a hand, etc.)

If at block 904, the NFC device determines that the deviations from the reference frequency do not exceed the frequency deviation threshold, then at block 906, the NFC device may continue monitoring the NFC antenna for changes in the frequency and may return to block 902.

By contrast, if at block 904, the NFC device determines that the deviations from the reference frequency exceed the frequency deviation threshold, then at block 908, the NFC may perform a full NFC polling procedure.

Figure 10:
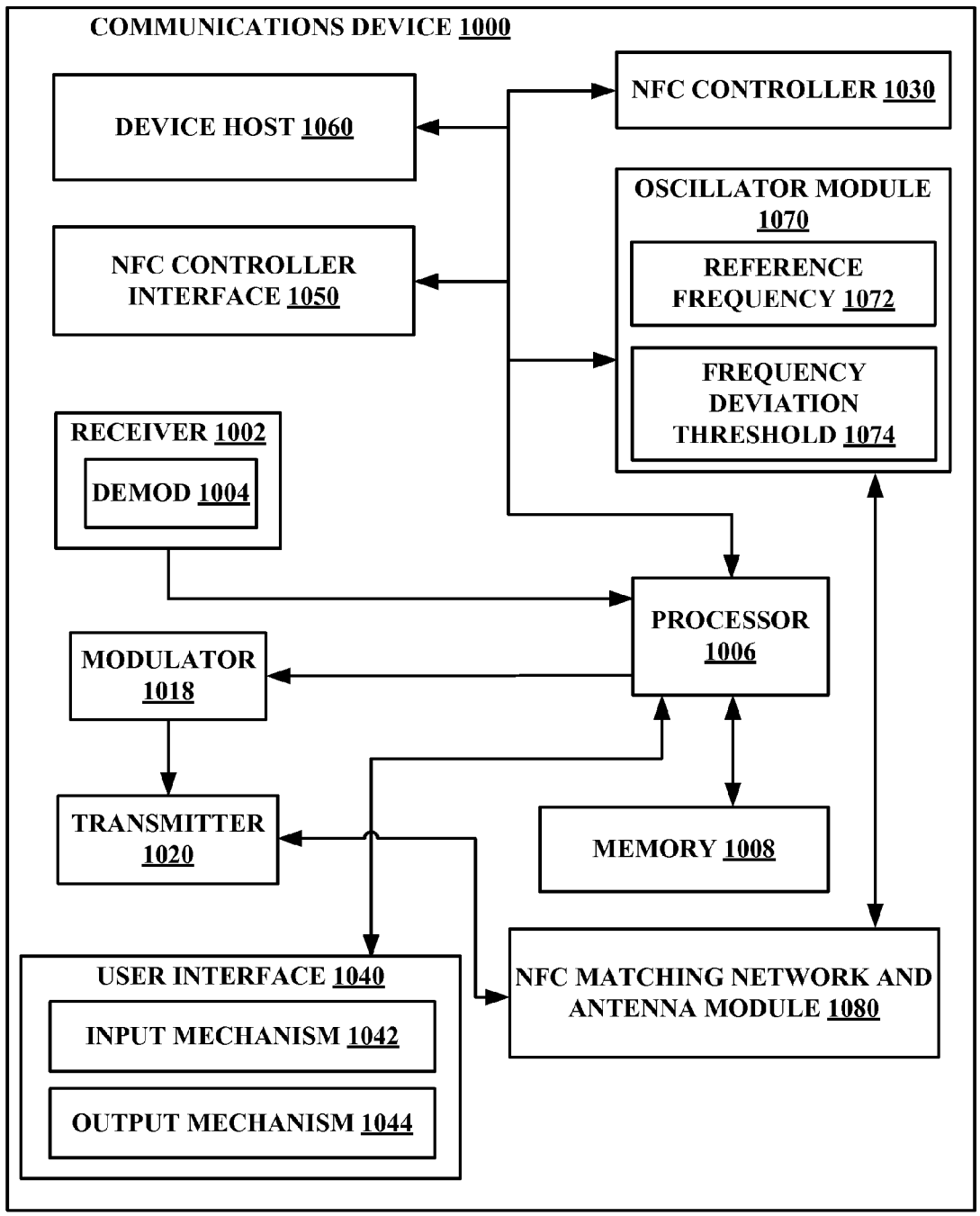
FIG. 10 is a functional block diagram example architecture of a communications device, according to an aspect.

While referencing FIG. 8, but turning also now to FIG. 10, an example architecture of communications device 1000 is illustrated. As depicted in FIG. 10, communications device 1000 includes receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can include a demodulator 1004 that can demodulate received symbols and provide them to processor 1006 for channel estimation. Processor 1006 can be a processor dedicated to analyzing information received by receiver 1002 and/or generating information for transmission by transmitter 1020, a processor that controls one or more components of communications device 1000, and/or a processor that both analyzes information received by receiver 1002, generates information for transmission by transmitter 1020, and controls one or more components of communications device 1000. Further, signals may be prepared for transmission by transmitter 1020 through modulator 1018 which may modulate the signals processed by processor 1006.

Communications device 1000 can additionally include memory 1008 that is operatively coupled to processor 1006 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, at least one of processor 1006, NFC matching network and antenna module 1080, or oscillator module 1070 can provide means for monitoring frequency oscillations generated by an oscillator circuit associated with a transmitter path of a NFC antenna and matching network, means for determining that a number of occurrences of the frequency oscillations from a reference frequency is greater than a frequency deviation threshold, and means for performing a NFC polling procedure in response to the determination.

It will be appreciated that data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1008 of the subject systems and methods may comprise, without being limited to, these and any other suitable types of memory.

Communications device 1000 may include NFC controller interface (NCI) 1050. In an aspect, NCI 1050 may be configured to enable communications between a NFC controller 1030 and device host 1060.

Communications device 1000 may include NFC matching network and antenna module 1080, or oscillator module 1070. As part of determining whether a remote NFC device is within the operating volume of communications device 1000, oscillator module 1070 may be configured to detect frequency deviations, associated with NFC matching network and antenna module 1080, that differ from a reference frequency 1072 by more than a frequency deviation threshold 1074.

In operation, oscillator module 1070 can assist in determining when there is a change in the environment of the antenna which causes a shift in impedance. Further, in the operational aspect, when oscillator module 1070 detect a change from reference frequency 1072 in the count value is greater than a frequency deviation threshold 1074, the communications device 1000 may be prompted to perform a full NFC polling procedure to determine whether the frequency deviation is based on the presence of a remote NFC device.

Additionally, communications device 1000 may include user interface 1040. User interface 1040 may include input mechanisms 1042 for generating inputs into communications device 1000, and output mechanism 1044 for generating information for consumption by the user of the communications device 1000. For example, input mechanisms 1042 may include a mechanism such as a key or keyboard, a mouse, a touch-screen display, a microphone, etc. Further, for example, output mechanism 1044 may include a display, an audio speaker, a haptic feedback mechanism, etc. In the illustrated aspects, the output mechanism 1044 may include a display configured to present media content that is in image or video format or an audio speaker to present media content that is in an audio format.

Figure 11:
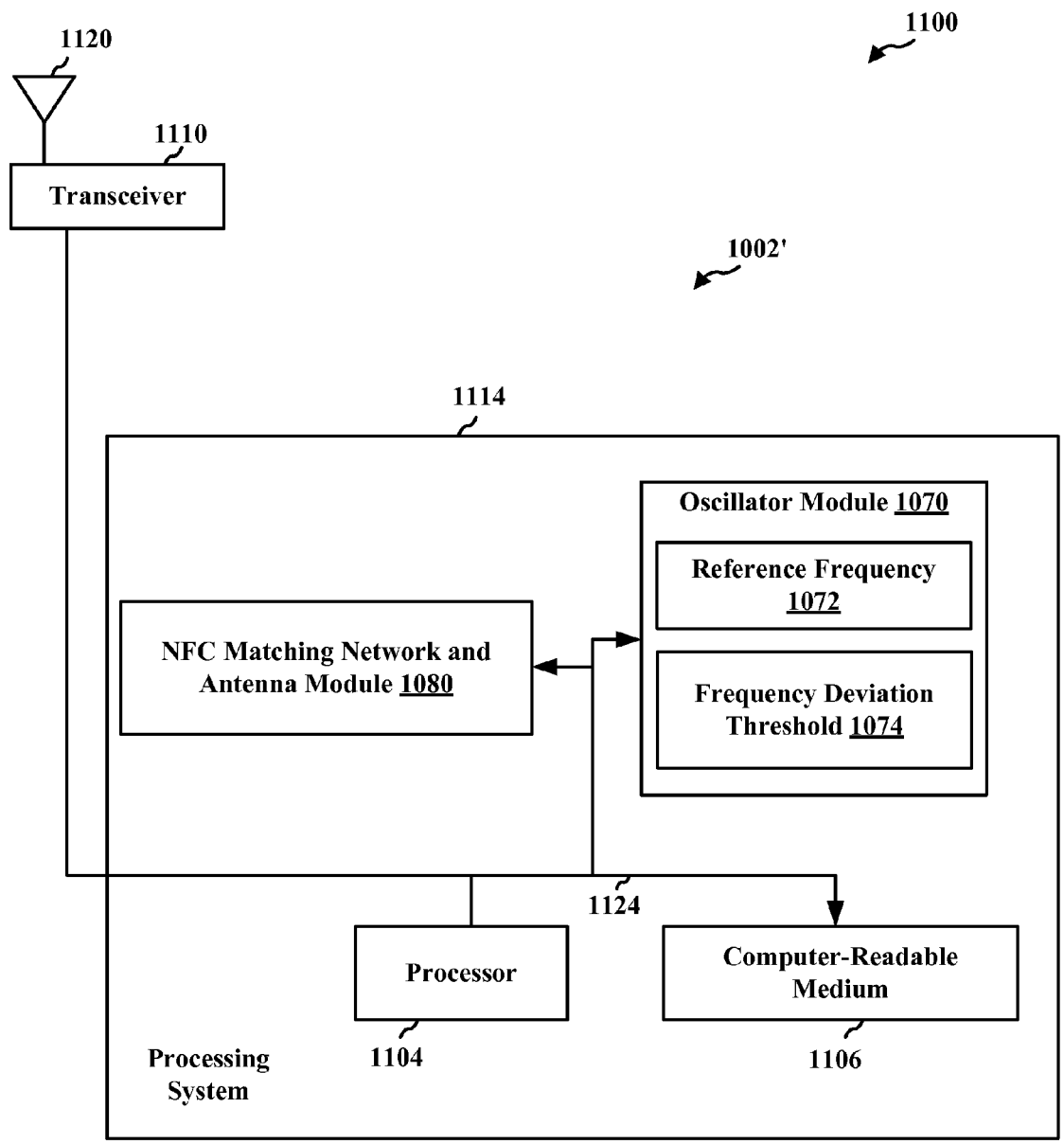
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1070, 1072, 1074, 1080, and the computer-readable medium 1106. The bus 1024 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to two or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1006, causes the processing system 1114 to perform the various functions described supra for any particular apparatus. The computer-readable medium 1106 may also be used for storing data that is manipulated by the processor 1104 when executing software. The processing system further includes at least one of the modules 1070, 1072, 1074, and 1080. The modules may be software modules running in the processor 1104, resident/stored in the computer-readable medium 1106, one or more hardware modules coupled to the processor 1104, or some combination thereof. In an aspect, the processing system 1114 may be a component of the communications device 1000 and may include the memory 1008 and/or at least one of transmitter 1020, receiver 1002, and processor 1006.

In a configuration, the apparatus 1000/1002' for inductive communications includes means for monitoring frequency oscillations generated by an oscillator circuit associated with a transmitter path of a NFC antenna and matching network, means for determining that a number of occurrences of the frequency oscillations from a reference frequency is greater than a frequency deviation threshold, and means for performing a NFC polling procedure in response to the determination. In an aspect, apparatus 1000/1002' may include means for determining that the performed access procedure was unsuccessful. In such an aspect, apparatus 1000/1002' means for monitoring may be further configured to count the number of occurrence using a frequency counter connected to the oscillator circuit.

As described supra, the processing system 1114 may include the transmitter 1020, receiver 1002, and processor 1006. As such, in one configuration, the aforementioned means may be the transmitter 1020, receiver 1002, and/or processor 1006 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of inductive communications, comprising:
monitoring frequency oscillations generated by an oscillator circuit associated with a transmitter path of a near field communication (NFC) antenna and matching network, the monitoring of the frequency oscillations including counting a number of occurrences of the frequency oscillations of a reference frequency using a frequency counter connected to the oscillator circuit;
determining whether the number of occurrences of the frequency oscillations of the reference frequency is greater than a frequency deviation threshold, wherein the reference frequency corresponds to an operation frequency of the NFC antenna; and
performing an NFC polling procedure in response to the determination that the number of occurrences of the frequency oscillations of the reference frequency is greater than the frequency deviation threshold.

2. The method of claim 1, wherein the reference frequency is an operating frequency for NFC communications.

3. The method of claim 1, wherein the number of occurrences of the frequency oscillations is averaged over a time duration.

4. The method of claim 1, wherein the frequency counter is connected to the oscillator circuit through a squaring buffer.

5. The method of claim 1, wherein the oscillator circuit is connected to the transmitter path of the NFC antenna and matching network using one or more commonly used pins associated with the transmitter path.

6. The method of claim 1, wherein the oscillator circuit is connected to the transmitter path of the NFC antenna and matching network using one or more pins separately assigned to the oscillator circuit.

7. The method of claim 1, wherein the reference frequency is adaptively determined based on one or more previously determined values.

8. The method of claim 1, wherein the frequency oscillations from the reference frequency are based on changes in impedance associated with the NFC antenna and matching circuit.

9. The method of claim 1, wherein a receiver path of the NFC. antenna is exposed to a high voltage source based at least one of:
reception of an incoming field by the NFC antenna; or
communication of an outgoing signal, wherein an input for the receiver path is positioned between an output for the transmitter path and the NFC antenna.

10. An apparatus for inductive communications, comprising:
means for monitoring frequency oscillations generated by an oscillator circuit associated with a transmitter path of a near field communication (NFC) antenna and matching network, the means for monitoring of the frequency oscillations being further configured to count a number of occurrences of the frequency oscillations of a reference frequency using a frequency counter connected to the oscillator circuit;
means for determining whether the number of occurrences of the frequency oscillations of the reference frequency is greater than a frequency deviation threshold, wherein the reference frequency corresponds to an operation frequency of the NFC antenna; and
means for performing an NFC polling procedure in response to the determination that the number of occurrences of the frequency oscillations of the reference frequency is greater than the frequency deviation threshold.

11. The apparatus of claim 10, wherein the reference frequency is an operating frequency for NFC communications.

12. The apparatus of claim 10, wherein the number of occurrences of the frequency oscillations is averaged over a time duration.

13. The apparatus of claim 10, wherein the frequency counter is connected to the oscillator circuit through a squaring buffer.

14. The apparatus of claim 10, wherein the oscillator circuit is connected to the transmitter path of the NFC antenna and matching network using one or more commonly used pins associated with the transmitter path.

15. The apparatus of claim 10, wherein the oscillator circuit is connected to the transmitter path of the NFC antenna and matching network using one or more pins separately assigned to the oscillator circuit.

16. The apparatus of claim 10, wherein the reference frequency is adaptively determined based on one or more previously determined values.

17. The apparatus of claim 10, wherein the frequency oscillations from the reference frequency are based on changes in impedance associated with the NFC antenna and matching circuit.

18. The apparatus of claim 10, wherein a receiver path of the NFC antenna is exposed to a high voltage source based at least one of:
reception of an incoming field by the NFC antenna; or
communication of an outgoing signal, wherein an input for the receiver path is positioned between an output for the transmitter path and the NFC antenna.

19. A non-transitory computer-readable medium comprising:
code for monitoring frequency oscillations generated by an oscillator circuit associated with a transmitter path of a near field communication (NFC) antenna and matching network, the code for monitoring frequency oscillations including code for counting a number of occurrences of the frequency oscillations of a reference frequency using a frequency counter connected to the oscillator circuit;
code for determining whether the number of occurrences of the frequency oscillations of the reference frequency is greater than a frequency deviation threshold, wherein the reference frequency corresponds to an operation frequency of the NFC antenna; and
code for performing an NFC polling procedure in response to the determination that the number of occurrences of the frequency oscillations of the reference frequency is greater than the frequency deviation threshold.

20. The non-transitory computer-readable medium of claim 19, wherein the reference frequency is an operating frequency for NFC communications.

21. The non-transitory computer-readable medium of claim 19, wherein the number of occurrences of the frequency oscillations is averaged over a time duration.

22. The non-transitory computer-readable medium of claim 19, wherein the frequency counter is connected to the oscillator circuit through a squaring buffer.

23. The non-transitory computer-readable medium of claim 19, wherein the oscillator circuit is connected to the transmitter path of the NFC antenna and matching network using one or more commonly used pins associated with the transmitter path.

24. The non-transitory computer-readable medium of claim 19, wherein the oscillator circuit is connected to the transmitter path of the NFC antenna and matching network using one or more pins separately assigned to the oscillator circuit.

25. The non-transitory computer-readable medium of claim 19, wherein the reference frequency is adaptively determined based on one or more previously determined values.

26. The non-transitory computer-readable medium of claim 19, wherein the frequency oscillations from the reference frequency are based on changes in impedance associated with the NFC antenna and matching circuit.

27. The non-transitory computer-readable medium of claim 19, wherein a receiver path of the NFC antenna is exposed to a high voltage source based at least one of:
   reception of an incoming field by the NFC antenna; or
   communication of an outgoing signal, wherein an input for the receiver path is positioned between an output for the transmitter path and the NFC antenna.

28. An apparatus for inductive communications, comprising:
   a near field communication (NFC) antenna and matching network;
   a oscillator circuit coupled to a transmitter path of the NFC antenna and matching network and configured to monitor frequency oscillations, the oscillator circuit being further configured to count a number of occurrences of the frequency oscillations of a reference frequency using a frequency counter connected to the oscillator circuit; and
   a processing system coupled to at least one or the oscillator circuit or the NFC antenna and matching network and configured to:
   determine whether the number of occurrences of the frequency oscillations of the reference frequency is greater than a frequency deviation threshold, wherein the reference frequency corresponds to an operation frequency of the NFC antenna; and
   perform an NFC polling procedure in response to the determination that the number of occurrences of the frequency oscillations of the reference frequency is greater than the frequency deviation threshold.

29. The apparatus of claim 28, wherein the reference frequency is an operating frequency for NFC communications.

30. The apparatus of claim 28, wherein the number of occurrences of the frequency oscillations is averaged over a time duration.

31. The apparatus of claim 28, wherein the frequency counter is connected to the oscillator circuit through a squaring buffer.

32. The apparatus of claim 28, wherein the oscillator circuit is connected to the transmitter path of the NFC antenna and matching network using one or more commonly used pins associated with the transmitter path.

33. The apparatus of claim 28, wherein the oscillator circuit is connected to the transmitter path of the NFC antenna and matching network using one or more pins separately assigned to the oscillator circuit.

34. The apparatus of claim 28, wherein the reference frequency is adaptively determined based on one or more previously determined values.

35. The apparatus of claim 28, wherein the frequency oscillations from the reference frequency are based on changes in impedance associated with the NFC antenna and matching circuit.

36. The apparatus of claim 28, wherein a receiver path of the NFC antenna is exposed to a high voltage source based at least one of:
   reception of an incoming field by the NFC antenna; or
   communication of an outgoing signal, wherein an input for the receiver path is positioned between an output for the transmitter path and the NFC antenna.

\* \* \* \* \*